United States Patent [19]

Bozdagi

[11] Patent Number: 5,784,115
[45] Date of Patent: Jul. 21, 1998

[54] SYSTEM AND METHOD FOR MOTION COMPENSATED DE-INTERLACING OF VIDEO FRAMES

[75] Inventor: Gozde Bozdagi, Rochester, N.Y.

[73] Assignee: Xerox Corporation, Stamford, Conn.

[21] Appl. No.: 775,215

[22] Filed: Dec. 31, 1996

[51] Int. Cl.$^6$ .................................................. H04N 7/01
[52] U.S. Cl. .................................... 348/452; 348/448
[58] Field of Search ................................ 348/448–452, 348/699–701

[56] References Cited

U.S. PATENT DOCUMENTS

| | | | |
|---|---|---|---|
| 5,016,102 | 5/1991 | Avis | 348/452 |
| 5,510,834 | 4/1996 | Weiss et al. | 348/699 |
| 5,579,054 | 11/1996 | Sezan et al. | 348/452 |
| 5,682,205 | 10/1997 | Sezan et al. | 348/452 |

OTHER PUBLICATIONS

IEEE ICASSP, May 1989, "Spatial Interpolation of Interlaced Television Pictures", Dennis M. Martinez et al., pp. 1886–1889.

IEEE ICASSP, May 1991, "Motion/Pattern Adaptive Interpolation of Interlaced Video Sequences", Yao Wang et al., pp. 2829–2832.

Signal Processing: Image Communication, vol. 5, 1993, "Block Motion Compensated Coding of Interlaced Sequences Using Adaptively Deinterlaced Fields", Andre Zaccarin et al., pp. 473–485.

Prentice Hall, 1995, "Digital Video Processing", a. Murat Tekalp, pp. 322–323.

Computer Vision and Image Understanding, vol. 63, No. 1, Jan. 1996, "The Robust Estimation of Multiple Motions: Parametric and Piecewise–Smooth Flow Fields", Michael J. Black et al., pp. 75–104.

IEEE Transactions on Pattern Analysis and Machine Intelligence, vol. 15, No. 4, Apr. 1993, Image Representation Using Block Pattern Models and its Image Processing Applications, Yao Wang et al., pp. 321–335.

Panasonic AG–EP80 Video Printer (NTSC), product brochure.

*Primary Examiner*—Victor R. Kostak
*Attorney, Agent, or Firm*—Oliff & Berridge, PLC

[57] ABSTRACT

A system and a method for motion-compensated de-interlacing of interlaced video frames that generates high quality progressive video frames, keeps computational complexity low and requires the use of only a single image frame is provided. The system and method of this invention determine if global motion (camera motion) is present in the scene. If global motion is detected, it is estimated and compensated. The globally-compensated image is then analyzed to determine whether local motion is present. If local motion is detected, the image pixels affected by the local motion are interpolated using motion-adaptive techniques. If no local motion and no global motion is detected, the image pixels are interleaved.

20 Claims, 23 Drawing Sheets

ORIGINAL FIELD

MOTION-COMPENSATED (WARPED) FIELD

SYSTEM AND METHOD FOR MOTION COMPENSATED DE-INTERLACING OF VIDEO FRAMES

BACKGROUND OF THE INVENTION

1. Field of Invention

This invention relates to de-interlacing interlaced video. More specifically, this invention is directed to a new motion compensated de-interlacing system and method for obtaining high quality progressive video frames from interlaced video frames.

2. Description of Related Art

To avoid flicker in video images, successive video frames have to be refreshed above a critical frequency, typically 50 to 60 frames per second. One conventional method that uses the available bandwidth more efficiently to avoid flicker includes transmitting the video images at 30 frames per second. This method then refreshes the video images at the receiver end at a rate of 60 frames per second by repeating each frame.

Another conventional method divides each video frame into an odd field (i.e., a subimage containing the odd lines) and an even field (i.e., a subimage containing the even lines). The method then alternately transmits these fields. At the receiver end, each field is displayed at 60 frames per second. This is called 2:1 interlaced video. This method results in better visual rendition and is used extensively by the television industry.

De-interlacing is the conversion from interlaced video to progressive video, by merging the odd and even fields together. De-interlacing is used to create still pictures from the interlaced video. These still pictures are viewed on progressive monitors or printed. However, because the odd and even fields are captured ⅟₆₀ of a second apart, motion artifacts often appear in the progressive frame. These motion artifacts are caused by movement of the camera, or by movement or changes in the content of the scene.

FIGS. 1 and 2 show the effects of motion artifacts on the final progressive frame. FIG. 1 is a progressive frame created from interlaced video while local movement occurred in the scene. FIG. 2 is a progressive frame created from interlaced video while both the camera moved and local movement occurred in the scene. In each case, movement that occurred faster than the field capture rate (60 hertz) resulted in blurring and smearing of the resulting progressive frame.

Prior methods for eliminating this de-interlacing problem include intra-field techniques, motion-adaptive techniques and motion-compensated techniques. Intra-field techniques employ line repetition, line averaging or nonlinear spatial interpolation methods using data from only a single field. One nonlinear spatial interpolation method is described in Martinez et al., "Spatial Interpolation of Interlace Television Pictures," IEEE ICASSP, May 1989, pages 1886–1889.

Although intra-field techniques are widely used because of their computational simplicity, the final progressive frame exhibits jagged and/or blurred edges, as seen in the progressive frame shown in FIG. 3. This progressive frame was obtained using line repetition methods. The jagged and/or blurred edges are due, in part, to using only a single field. That is, using only a single field results in a lack of novel information otherwise obtainable from the neighboring field.

Motion-adaptive techniques, such as that described in Wang et al., "Motion/Pattern Adaptive Interpolation of Interlaced Video Sequences," IEEE ICASSP, May 1991, pages 2829–2832, employ different algorithms depending on whether local motion is present in the scene. If local motion is detected, the spatial interpolation techniques mentioned above are utilized to compensate for the motion. If no local motion is detected, the two fields are simply interleaved.

Motion-adaptive techniques yield superior results to intra-field techniques when local motion is absent, because information from both fields is used. However, because intra-field techniques are used when local motion is present, the progressive frame also exhibits jagged and/or blurred edges, as seen in FIG. 4. FIG. 4 is a frame with both global and local motion that has been de-interlaced by motion-adaptive techniques. Furthermore, motion-adaptive techniques only detect whether motion is present. Therefore, when a frame has only global motion, the one field will simply be discarded, with no motion compensation applied.

With motion-compensated techniques, described in Zaccarin et al., "Block Motion Compensated Coding of Interlace Sequences Using Adaptively De-Interlaced Fields," Signal Processing: Image Communication, Vol. 5, pgs. 473–485, 1993, the method initially detects whether motion is present. If either local or global motion is detected, the motion trajectory of every pixel is estimated. As a result, this technique compensates for both global and local motion. In practice, however, reliably estimating of motion vectors for every pixel poses serious computational problems.

To overcome these problems, a 3-field hybrid de-interlacing method has been proposed in A. Murat Tekalp, *Digital Video Processing*, Prentice-Hall, 1995, pages 322–323. With this method, global motion compensation is first performed on the image. Motion-adaptive techniques are then performed on the globally-compensated image to compensate for local motion.

One problem with this method is that it requires three fields. As a result, two image frames need to be captured, where the first two fields are taken from the first frame and the third field is taken from the second frame. Conventional image frame capture cards only capture a single image frame. Therefore, implementing the three-field hybrid de-interlacing method requires more expensive and complex special-purpose image capture cards.

Another problem with the hybrid method is that global motion estimation and compensation is performed whenever any type of motion is detected. Therefore, when only local motion is present, global motion estimation and compensation is performed even though it is not needed. This unnecessarily increases the computational complexity, and may also yield erroneous results.

SUMMARY OF THE INVENTION

This invention thus provides a system and a method for motion-compensated de-interlacing of interlaced video frames to generate high quality progressive video frames. The system and the method of this invention also keep the computational complexity low and require only two fields (i.e., a single image frame). Thus, the system and method of this invention can be implemented with conventional single-frame image capture cards.

The system and method of this invention determine if global motion (camera motion) is present in the scene. If global motion is detected, the global motion is estimated and compensated. The globally-compensated image is then analyzed to determine whether local motion is present. If local motion is detected, the pixels affected by the local motion are interpolated using motion-adaptive techniques.

In a preferred embodiment of the method, global motion is determined by computing a motion map between the even and odd fields by looking at the field differences within a block around each image pixel. If the number of "on" pixels within the motion map (i.e., the number of pixels affected by global motion) falls above a predetermined threshold, the method determines that global motion is present. If global motion is present, the global motion is preferably estimated using optical flow analysis and affine parametrization.

In the preferred embodiment, one of the fields is divided into a plurality of discrete blocks, and the affine parameters are estimated for each of these blocks. If global motion is a dominant motion within the frame, the respective values of the estimated affine parameters for each of the blocks tends to cluster around the value representing the global motion. The affine parameter values at the center of the cluster with the most members are chosen as the final estimated affine parameters for the global motion. The global motion is then compensated by warping one of the odd and even fields using the chosen affine parameters.

Local motion is determined by computing a second motion map between the warped one of the odd and even fields and the other one of the odd and even fields. In the preferred embodiment, the "on" pixels falling within the second motion map (i.e., the pixels affected by local motion) are compensated using edge-adaptive interpolation.

These and other features and advantages of this invention are described in or are apparent from the following detailed description of the preferred embodiments.

BRIEF DESCRIPTION OF THE DRAWINGS

The preferred embodiments of this invention will be described in detail, with reference to the following figures, wherein.

DETAILED DESCRIPTION OF PREFERRED EMBODIMENTS

Figure 5:
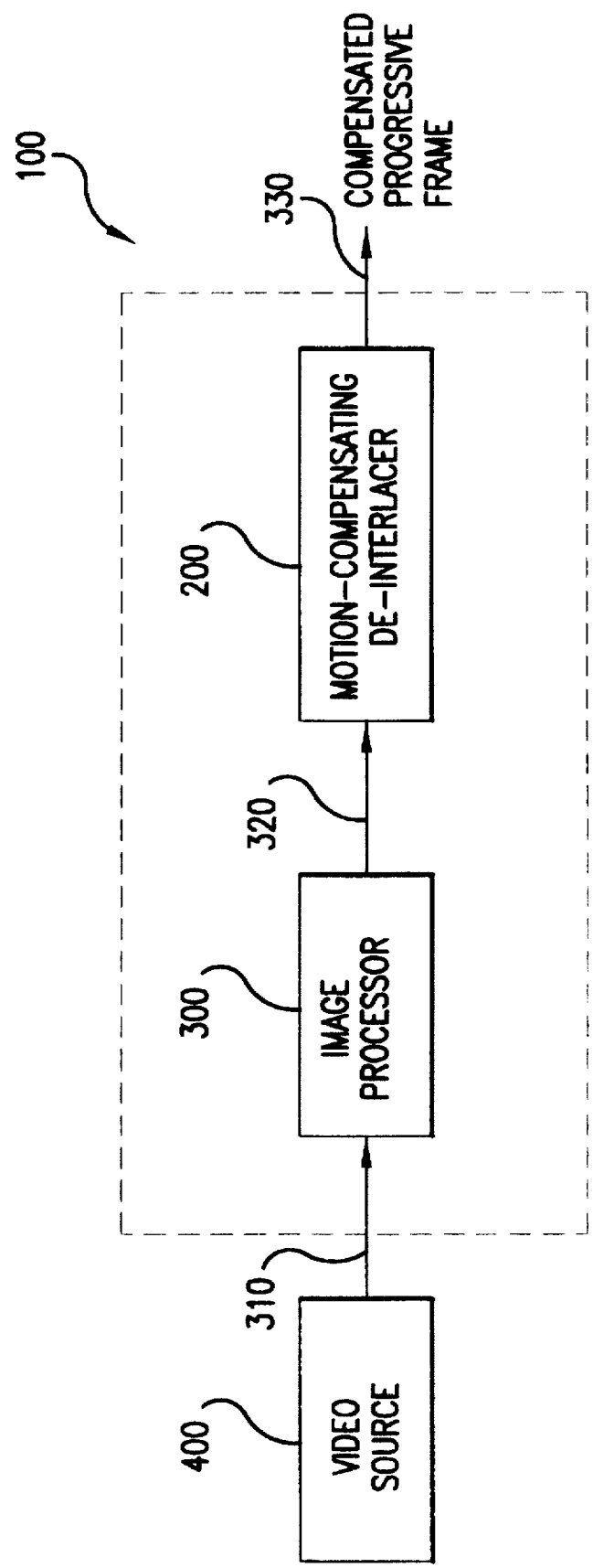
FIG. 5 is a block diagram of a video system incorporating the motion-compensating de-interlacer of this invention.

FIG. 5 illustrates a video system 100 incorporating the motion-compensating de-interlacer 200 of this invention. The system includes an image processor 300 that receives video signals over signal line 310 from a video source 400. The image processor 300 includes an image frame capture card (not shown) that captures and digitizes each video frame. The motion-compensating de-interlacer 200 of this invention requires only a single image frame as an input. Therefore, a conventional single-frame image capture card is preferably used in image processor 300. This reduces the cost and complexity of the video system 100.

The image processor 300 sends a digitized single video frame to the motion-compensating de-interlacer 200 over a signal line 320. The motion-compensating de-interlacer 200 de-interlaces the video frame, compensates for global and local motion and outputs a motion-compensated progressive video frame over a signal line 330 to an output device or a storage device (not shown). The operation of the motion-compensating de-interlacer will be explained in more detail below.

Figure 6:
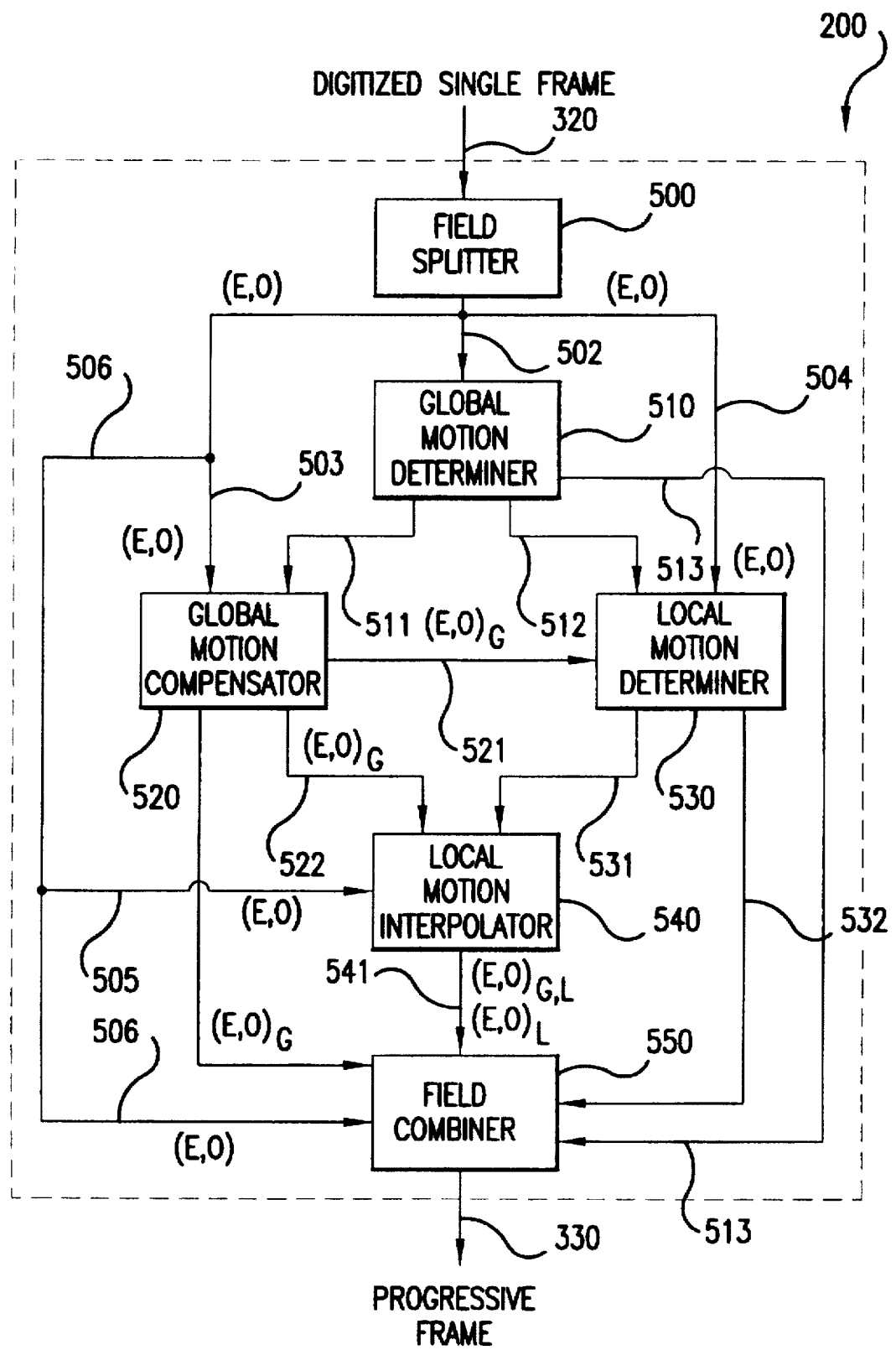
FIG. 6 is a block diagram of a first preferred embodiment of the motion-compensating de-interlacer of this invention.

FIG. 6 illustrates a first preferred embodiment of the motion-compensating de-interlacer 200 of this invention. The motion-compensated de-interlacer 200 includes a field splitter 500, a global motion determiner 510, a global motion compensator 520, a local motion determiner 530, a local motion interpolator 540 and a field combiner 550.

The digitized single-frame of interlaced video is input to the field splitter 500 over the signal line 320. The field splitter splits the interlaced video frame into an even (E) field and an odd (O) field. The even and odd fields are output to the global motion determiner 510, the global motion compensator 520, the local motion determiner 530, the local motion interpolator 540 and the field combiner 550 over signal lines 502, 503, 504, 505 and 506, respectively. The global motion determiner 510 outputs control signals over signal lines 511, 512 and 513 to the global motion compensator 520, the local motion determiner 530 and the field combiner 550, respectively. The global motion compensator 520 outputs the globally-compensated video frame $(E,O)_G$ to the local motion determiner 530 and the local motion interpolator 540 over signal lines 521 and 522, respectively. The local motion determiner 530 outputs control signals over signal lines 531 and 532 to the local motion interpolator 540 and the field combiner 550, respectively. The local motion compensator 540 outputs either the globally compensated and locally-interpolated video frame $(E,O)_{GL}$ or the locally-interpolated video frame $(E,O)_L$ to the field combiner 550 over a signal line 541. The field combiner 550 outputs a progressive video frame over the signal line 330.

In operation, the field splitter 500 splits an interlaced video frame into the even (E) and odd (O) fields and outputs the even and odd fields to the global motion determiner 510, the global motion compensator 520, the local motion determiner 530, the local motion interpolator 540 and the field combiner 550.

The global motion determiner 510 determines if global motion is present in the split video frame (E,O). If global motion is detected, the global motion determiner 510 directs the global motion compensator 520 to globally-compensate the even and odd fields, and output the globally-compensated split video frame $(E,O)_G$ to the local motion determiner 530, the local motion interpolator 540 and the field combiner 550. In addition, the global motion determiner 510 directs the local motion determiner 530 to determine if local motion is present in the globally-compensated split video frame $(E,O)_G$. If the global motion determiner 510 does not detect global motion, it directs the local motion determiner 530 to determine if local motion is present in the split video frame (E,O).

If global motion is present in the split video frame (E,O), the local motion determiner 530 determines if local motion is present in the globally-compensated split video frame $(E,O)_G$ output by the global motion compensator 520. If the local motion determiner 530 detects local motion, it directs the local motion interpolator 540 to locally interpolate the globally-compensated split video frame $(E,O)_G$ output from the global motion compensator 520. If global motion is not present in the split video frame (E,O), the local motion determiner 530 determines if local motion is present in the split video frame (E,O) output by the field splitter 500. If the local motion determiner 530 detects local motion, it directs the local motion interpolator 540 to locally interpolate the split video frame (E,O) output by the field splitter 500.

The local motion interpolator 540 outputs either a globally-compensated and locally-interpolated split video frame $(E,O)_{GL}$ or a locally-interpolated split video frame $(E,O)_L$ to the field combiner 550. However, if the local motion determiner 530 does not detect local motion in either the globally-compensated split video frame $(E,O)_G$ or the split video frame (E,O), the local motion interpolator 540 does not output either signal. The field combiner 550, in response to control signals from the global motion determiner 510 and the local motion determiner 530, combines the even (E) and odd (O) fields of one of the split video frame (E,O), the globally-compensated split video frame $(E,O)_G$, the globally-compensated and locally-interpolated split video frame $(E,O)_{GL}$ or the locally-interpolated split video frame $(E,O)_L$ into a progressive video frame. The field combiner 550 outputs the progressive video frame over the signal line 330.

Figure 7:
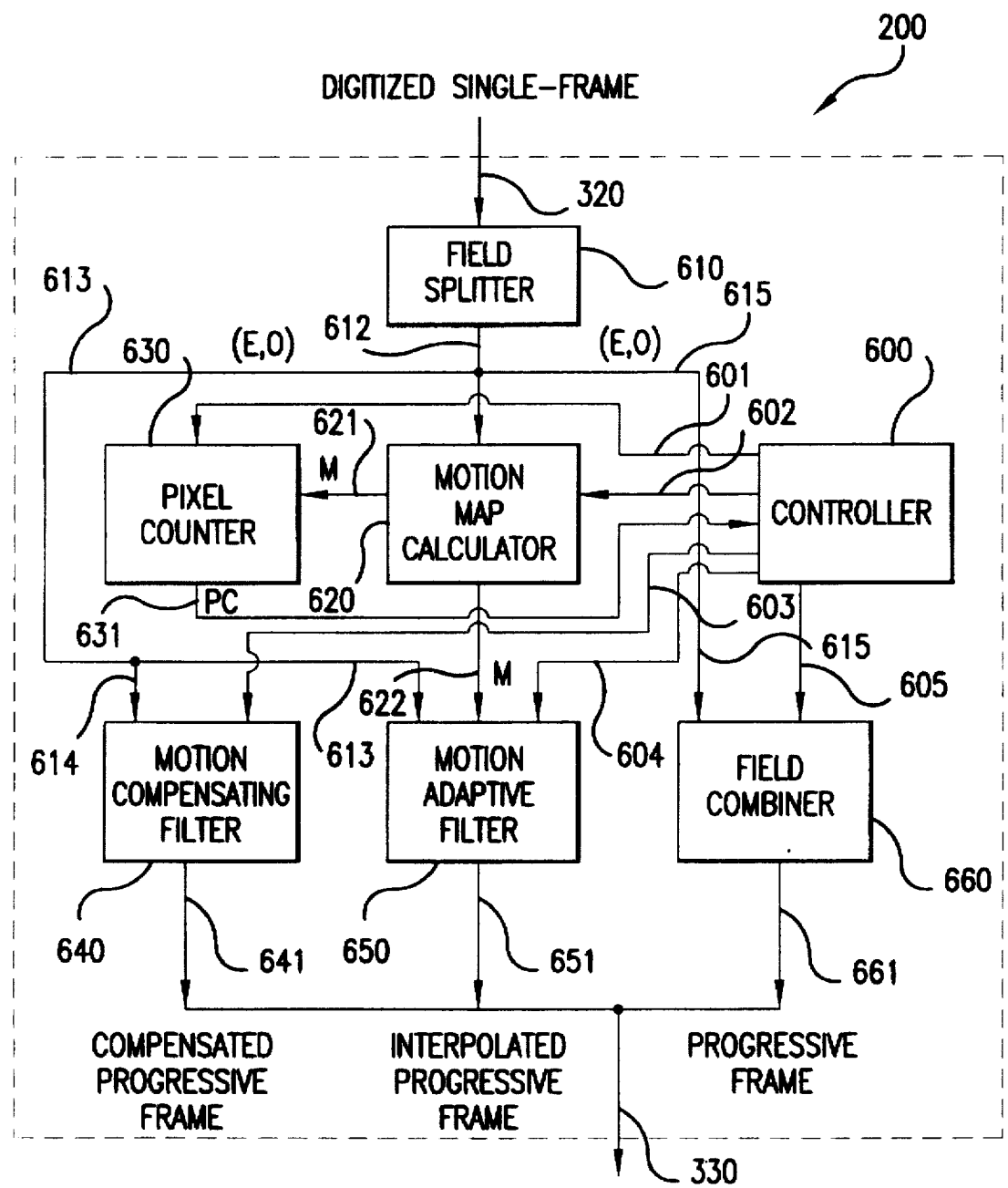
FIG. 7 is a block diagram of a second preferred embodiment of the motion-compensating de-interlacer of this invention.

FIG. 7 illustrates a second preferred embodiment of the motion-compensating de-interlacer 200 of this invention. This embodiment comprises a controller 600, a field splitter 610, a motion map calculator 620, a pixel counter 630, a motion-compensating filter 640, a motion-adaptive filter 650 and a field combiner 660.

The controller 600 outputs control signals over signal lines 601, 602, 603, 604 and 605 to the pixel counter 630, the motion map calculator 620, the motion-compensating filter 640, the motion-adaptive filter 650 and the field combiner 660, respectively. The digitized single-frame of interlaced video is input to the field splitter 610 over the signal line 320. The field splitter 610 outputs the even (E) and odd (O) fields of the video frame to the motion map calculator 620, the motion-adaptive filter 650, the motion-compensating filter 640 and the field combiner 660 over signal lines 612, 613, 614 and 615, respectively. The motion map calculator 620 outputs a motion map M to the pixel counter 630 and the motion-adaptive filter 650 over signal lines 621 and 622, respectively. The pixel counter 630 outputs a pixel count PC to the controller 600 over a signal line 631. The motion-compensating filter 640 and the motion-adaptive filter 650 each outputs a progressive video frame over a signal line 641 or a signal line 651, respectively. The field combiner 660 outputs a progressive video frame over signal lines 661. The signal line 641, 651 and 661 connect to the signal line 330.

In operation, the field splitter 610 splits the interlaced video frame into the even (E) and odd (O) fields. The field splitter 610 outputs the even and odd fields E and O to the motion map calculator 620, the motion-compensating filter 640, the motion-adaptive filter 650 and the field combiner 660.

The motion map calculator 620 calculates a motion map M between the even and odd fields E and O and outputs the motion map M to the pixel counter 630 and the motion adaptive filter 650. The pixel counter 630 counts the number of image pixels with a gray-level value of "0" (PC) and sends the result to the controller 600 over the signal line 631.

The controller 600 determines if there is global and/or local motion in the video frame based on the pixel count PC. If global motion is present, the controller 600 activates the motion-compensating filter 640. The motion-compensating filter 640 compensates for the global motion and interpolates for any local motion that is present in the video frame. The motion-compensating filter 640 also combines the motion-compensated even (E) and odd (O) fields of the compensated video frame into the compensated progressive video frame.

If the controller 600 determines that there is local motion, but no global motion, in the video frame, the controller 600 activates the motion-adaptive filter 650. The motion-adaptive filter 650 locally interpolates the video frame and combines the even (E) and odd (O) fields of the locally-interpolated video frame into a locally-interpolated progressive video frame.

If the controller 600 determines that there is neither global nor local motion in the video frame, the controller 600 activates the field combiner 660, which combines the even (E) and odd (O) fields of the video frame into the progressive video frame.

Figure 8:
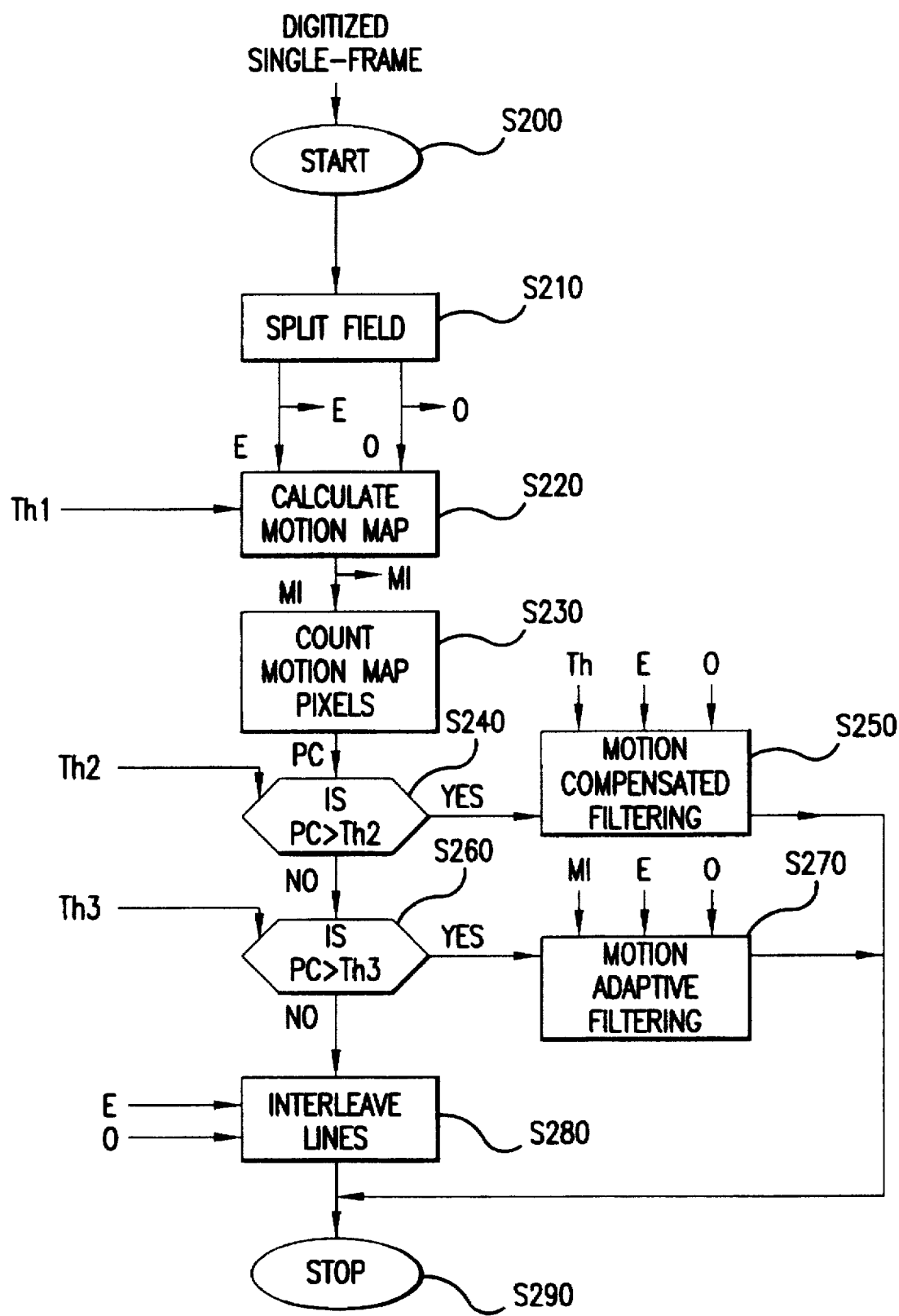
FIG. 8 is a flow chart of a preferred control routine for the motion-compensating de-interlacer of this invention.
Figure 9:
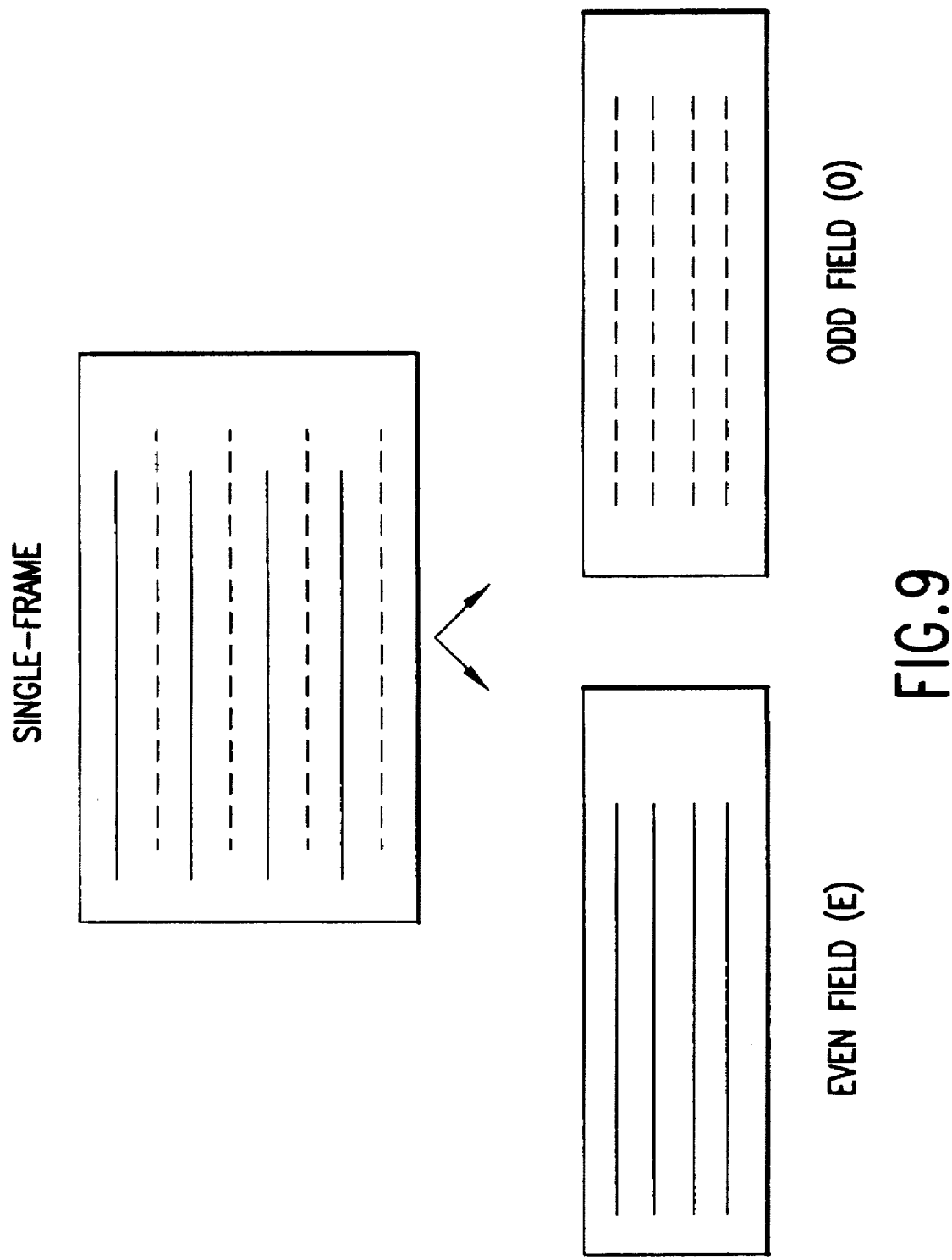
FIG. 9 illustrates the splitting of a composite single frame into an even field and an odd field.

FIG. 8 shows a preferred control routine for the motion-compensating de-interlacer 200 of this invention. The routine starts at step S200 and proceeds to step S210, where it splits the digitized single video frame into an even field E and an odd field O, as illustrated in FIG. 9. As explained above, the even and odd fields E and O are subimages containing the even and odd lines of the video frame, respectively.

In step S220, the control system calculates a motion map M1 using the threshold Th1 between the even and odd fields E and O by determining the field differences within a block around each image pixel. Control then continues to step S230.

In step S230, the control system counts the number of pixels in the motion map M1 having a gray level value of 0 and assigns this number to the value PC.

Next, in step S240, the control system compares PC to a predetermined threshold value Th2. If PC is greater than Th2, the control system determines that there is global motion in the video frame. Control thus continues to step S250. Otherwise, is PC is less than or equal to Th2, the control system determines that there is no global motion in the video frame. Control thus jumps to step S260. The value Th2 may be adjusted to calibrate the system. However, in the preferred embodiment, Th2 is set to P/2, where P is the total number of pixels in the video frame.

In step S250, the control system estimates and compensates for the global motion present in the video frame. In addition, in step S250 the control system determines if local motion is present in the globally-compensated image. If local motion is detected, the pixels affected by the local motion are interpolated using motion-adaptive techniques. Control then jumps to step S290.

In step S260, the control system determines if PC is greater than the threshold Th3. The threshold Th3 is used to determine if local motion is present. Th3 may be adjusted to calibrate the system. However, Th3 is preferably set at a value below 0.10P, i.e. below approximately 10% of the total number of image pixels P in the video frame.

If PC is greater than Th3, the control system determines that there is local motion. Control then continues to step S270. Otherwise, if PC is not greater than Th3, control jumps to step S280. In step S270, the routine locally interpolates the pixels affected by the local motion using edge-adaptive interpolation. Control then jumps to step S290.

In step S280, the control system interleaves the fields E and O into a single interleaved progressive frame. The control system then continues to step S290. In step S290, the control routine stops.

Figure 10:
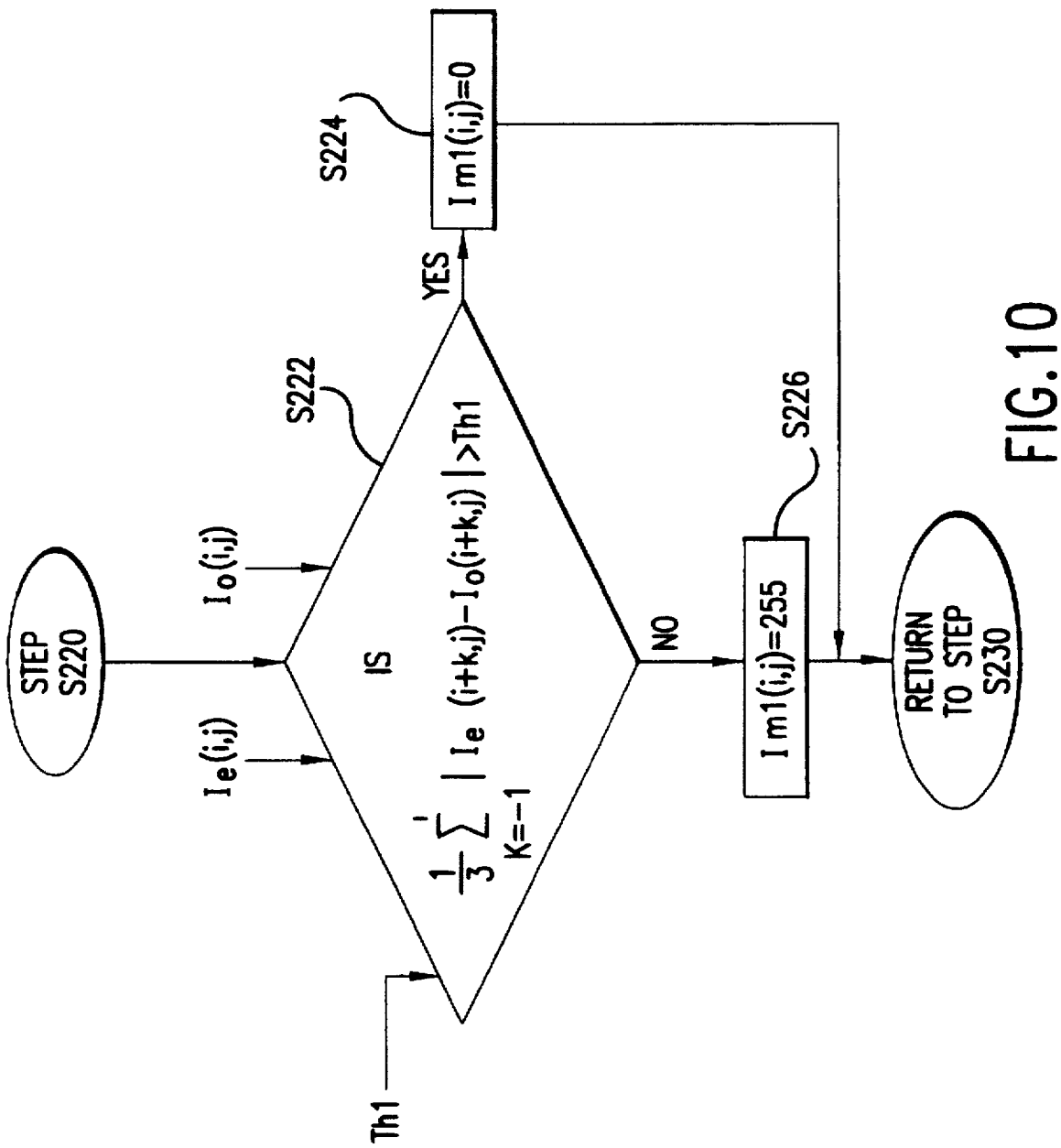
FIG. 10 is a flow chart of a preferred control routine for the motion map calculation step of FIG. 7.

FIG. 10 shows a preferred control routine for calculating a single image pixel of the motion map. The gray level, or intensity, of each image pixel in the motion map is determined at step S222 by:

$$\frac{1}{3} \sum_{K=-1}^{1} |I_e(i+k,j) - I_o(i+k,j)| > Th1 \quad (1)$$

where:

$I_e(i,j)$ and $I_o(i,j)$ are the gray levels of image pixel (i,j) in the even and odd fields, respectively; and the threshold Th1 is the gray level threshold.

The threshold Th1 may be adjusted to calibrate the system, and is preferably between 0 and 50.

For every image pixel in the video frame, the control system calculates the average gray level in a 1×3 pixel block centered on the image pixel being mapped. This average is calculated for both the even field E and the corresponding location in the odd field O. The control system then compares the average gray level in the corresponding even and odd field locations E and O. If the absolute value of the difference is greater than threshold Th1, control continues to step S224. Otherwise, control jumps to step S226.

In step S224, a gray level of 0 (dark) is assigned to the motion map pixel M(i, j). In step S226, a gray level of 255 (white) is assigned to motion map pixel M(i, j). It should be appreciated that the control routine of FIG. 10 (steps S222–S226) is iterative. Thus, the above-described calculations and analysis are performed for every image pixel (i, j) in the video frame before control continues to step S230 from step S220.

Figure 11A:
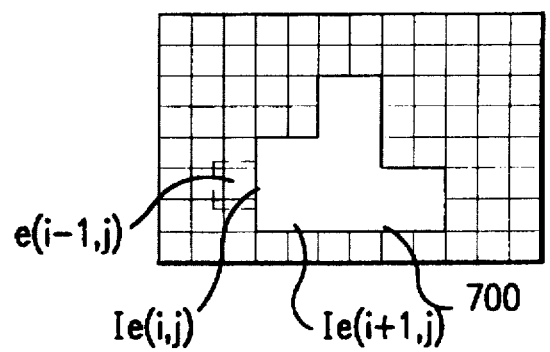
FIG. 11 illustrates representative even and odd video frame fields and a corresponding motion map.
Figure 11B:
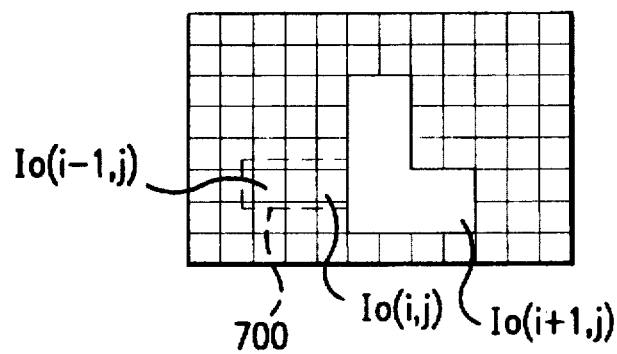
Figure 11C:
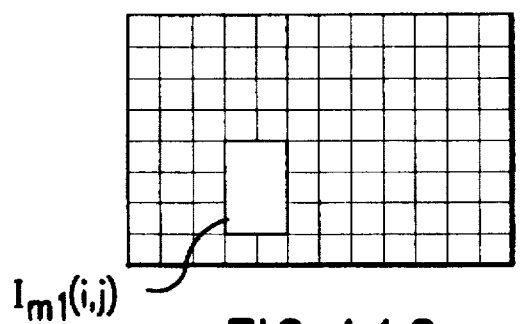

A graphical example of the motion map calculation is shown in FIG. 11. FIG. 11 shows a representative even field E, a representative odd field O and the corresponding motion map M1 calculated in step S220. As explained above, the control system calculates the average gray level value for a 1×3 pixel block 700 centered on the image pixel (i,j) being mapped for both the even field and the corresponding location in the odd field. The control system then compares the absolute value of the difference between the average gray level values in the corresponding E and O field locations to the predetermined threshold Th1 to determine which gray level value, 0 or 255, to assign to the motion map pixel (i,j). In the sample block 700 shown in FIG. 11, the difference in the average gray level value between the even and odd fields for the pixel (i,j) exceeds the threshold Th1. Therefore, the routine assigns a value of 0 to the motion map pixel (i,j).

Figure 12:
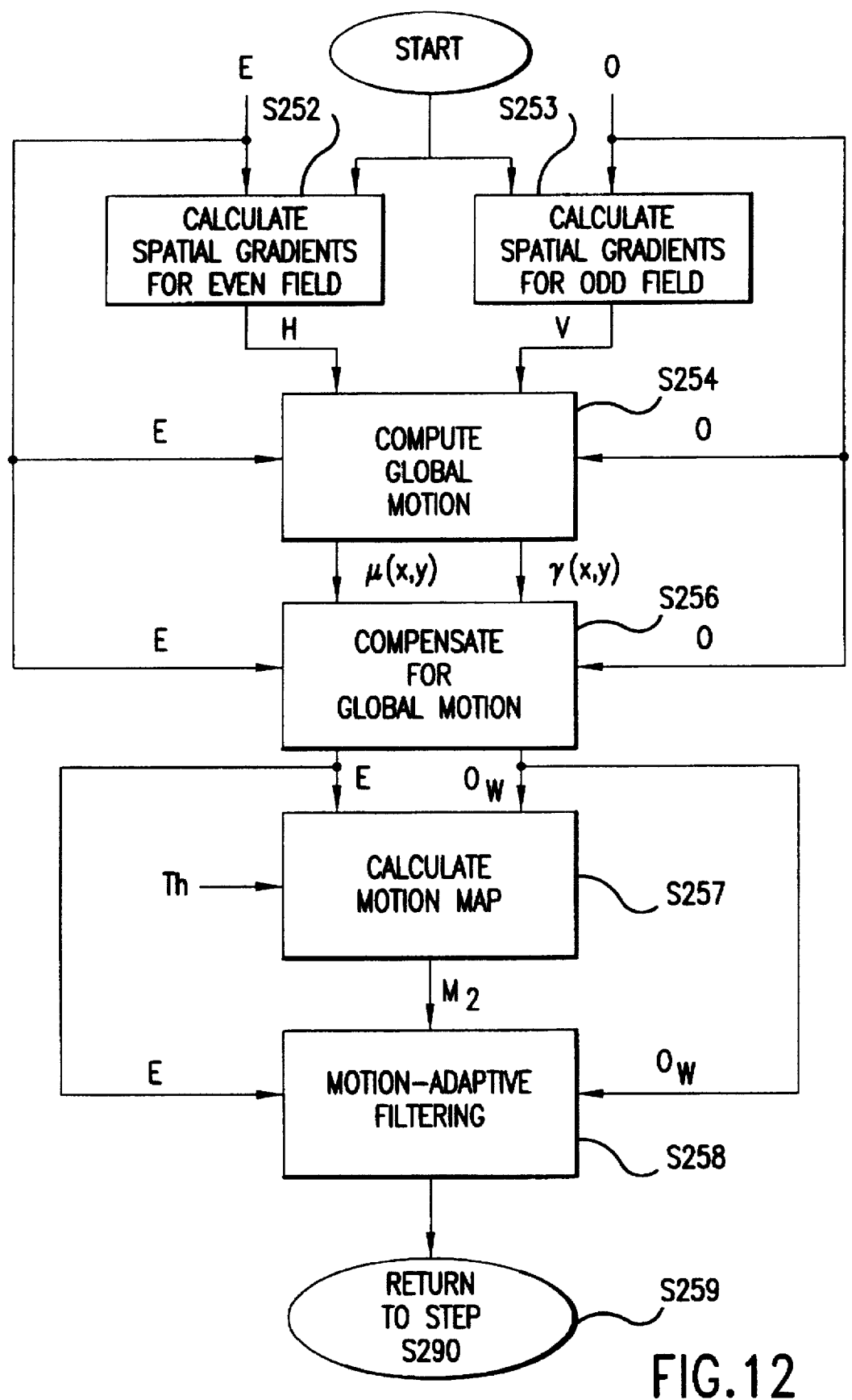
FIG. 12 is a flow chart of a preferred control routine for the motion-compensated filtering step of FIG. 7.

FIG. 12 illustrates a preferred control routine for the motion-compensated filtering step S250. In steps S252 and S253, the control system calculates the spatial gradient for the even field E and for the odd field O, respectively, using the preferred control routine shown in FIG. 13.

The control system then determines the global motion in step S254 using the spatial gradients H and V, and the even and odd fields E and O. The control system calculates affine parameter estimates ($a_0$, $a_1$, $a_2$, $a_3$, $a_4$ and $a_5$) using the well-known optical flow analysis and affine parametrization techniques discussed in Black et al., "The Robust Estimation of Multiple Motions: Parametric and Piecewise-Smooth Flow Fields," Computer Vision and Image Understanding, vol. 63, no. 1, January 1996, pp. 75–104.

Specifically, the optical flow analysis is defined as:

$$u(i,j)=a_0 i + a_1 j + a_2 \quad (2)$$

$$v(i,j)=a_3 i + a_4 j + a_5 \quad (3)$$

$$H(i,j) \cdot u(i,j) + V(i,j) \cdot v(i,j) + I_t(i,j) = 0 \quad (4)$$

where:

$a_0$, $a_1$, $a_2$, $a_3$, $a_4$ and $a_5$ are the affine parameters;

$H(i,j)$ and $V(i,j)$ are the horizontal and vertical spatial gradients, respectively; and $I_t(i,j)$ is the temporal difference between the even and odd fields.

Figure 14:
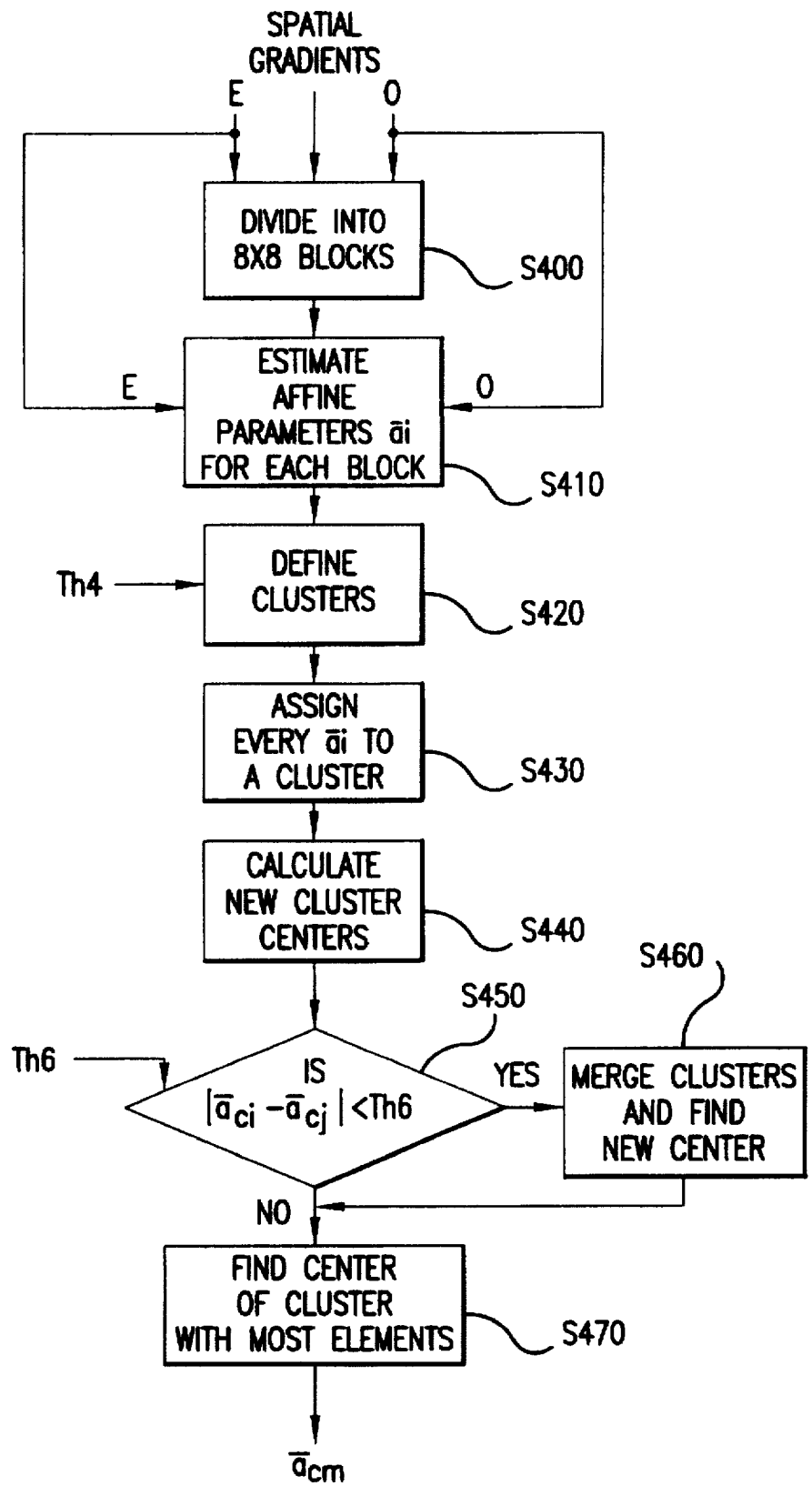
FIG. 14 is a flow chart of a preferred control routine for choosing a set of affine parameters used to compute global motion.

The control system estimates the affine parameters using a least-squares estimation technique. Prior motion-compensating methods use all the image pixels within the E and O fields in the least-squares estimation of the affine parameters. However, this will result in a less accurate global motion estimation if local motion is also present. To avoid this problem, the control routine of FIG. 14 is preferably used to determine the set of affine parameters used for estimating the global motion.

Figure 17A:
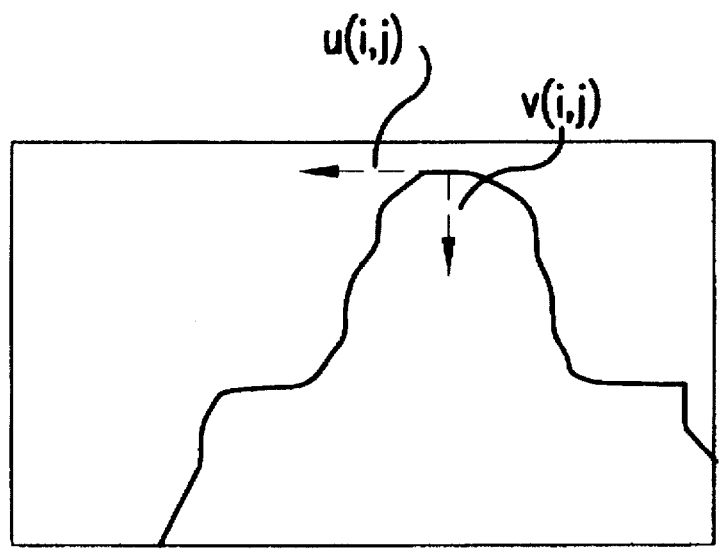
FIG. 17A shows a representative image field.
Figure 17B:
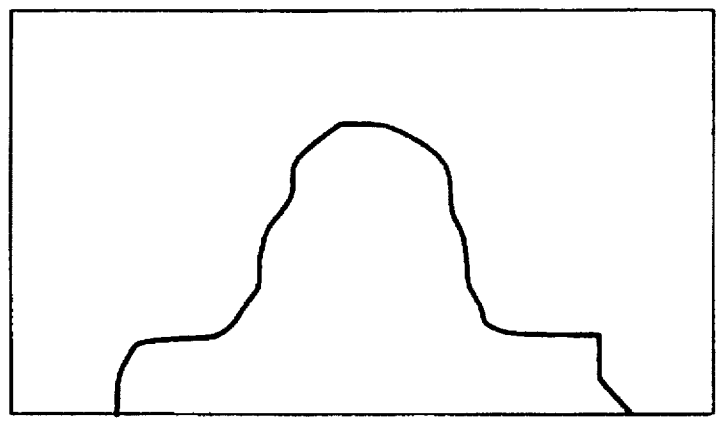
FIG. 17B shows the representative image field of FIG. 17A after warping using the estimated affine parameters.

Then, in step S256, the control system compensates for the global motion by "warping" one of the fields using the affine parameter estimates $a_0$, $a_1$, $a_2$, $a_3$, $a_4$ and $a_5$. Specifically, every image pixel within the field being warped is calculated using the optical flow estimates to obtain the motion-compensated field. If $I_{or}(i,j)$ is the gray-level of the pixel (i,j) in the original field (i.e., before warping), then the relationship between the motion-compensated field and the original field is:

$$I_{or}(i,j) = I_w[(1+a_0)i + a_1 j + a_2, a_3 i + (1+a_4)j + a_5] \quad (5)$$

where $I_w[(1+a_0)i + a_1 j + a_2, a_3 i + (1+a_4)j + a_5]$ is the gray-level in the motion-compensated field. This is graphically illustrated in FIGS. 17A and 17B, which show a representative image field before and after warping.

In step S257, the control system calculates a motion map between the warped odd field $O_w$ and the even field E. This is shown in greater detail in FIG. 18.

In step S258, the control system motion-adaptively filters the fields E and $O_w$. This is shown in greater detail in FIG. 19.

Figure 13:
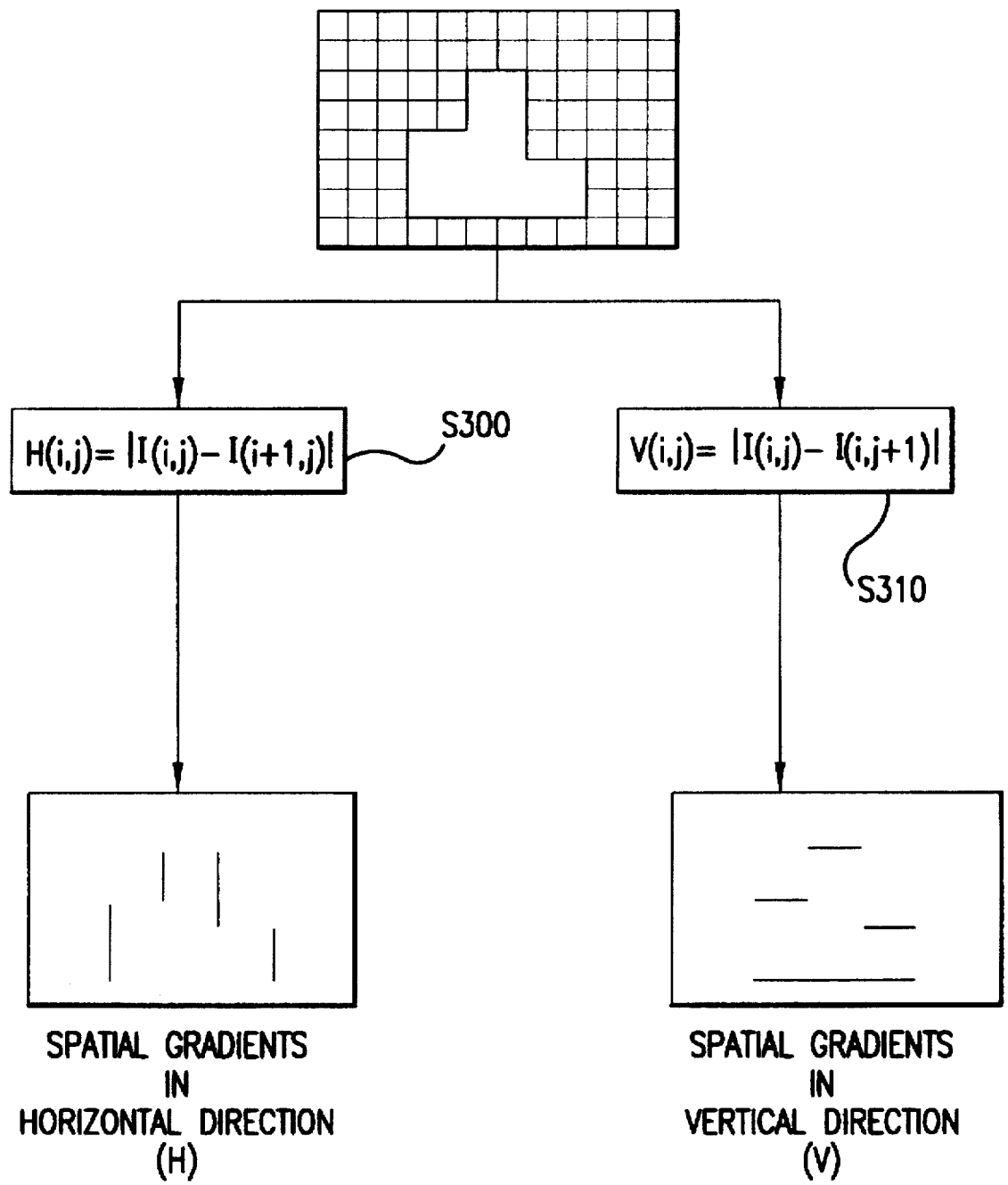
FIG. 13 is a flow chart of a preferred control routine for calculating the spatial gradients of the even and odd fields.

FIG. 13 shows steps S252 and S253 in greater detail. In FIG. 13, in both the even and odd fields E and O, the spatial gradients in the horizontal direction H(i,j) for each image pixel location (i,j) are calculated at step S300 as:

$$H(i,j)=|I(i,j)-I(i+1,j)| \qquad (6)$$

where I(i,j) is the gray level for pixel location (i,j) for either the odd or even field. Similarly, the control system calculates the spatial gradients in the vertical direction V(i,j) for both the even and odd fields at step S310 as:

$$V(i,j)=|I(i,j)-I(i,j+1)|. \qquad (7)$$

Figure 15:
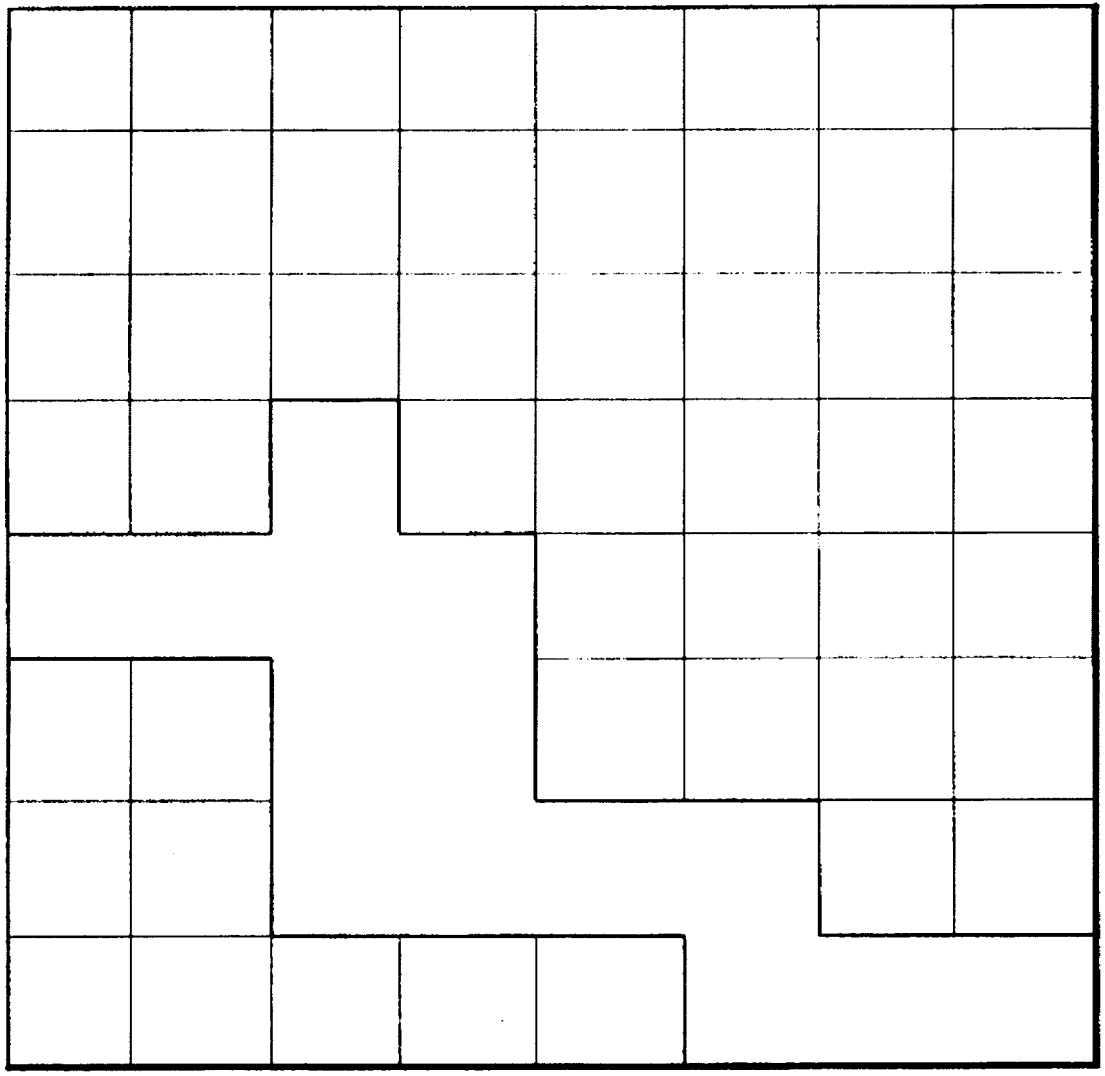
FIG. 15 illustrates a representative 8×8 block of image pixels.

FIG. 14 shows the method for determining the affine parameters in greater detail. As shown in FIG. 14, at step S400, the routine divides either the even field E or the odd field O field into 8×8 pixel blocks, as shown in the representative 8×8 pixel block shown in FIG. 15. In step S410, a set of affine parameters $\bar{a}_i$ is estimated for each 8×8 pixel block using the least-squares estimation techniques described in Black et al.

Next, in step S420, the control system defines clusters of affine parameter sets $\bar{a}_i$. The control system builds the clusters by assigning any $\bar{a}_i$ as a first cluster center $\bar{a}_{ci}$, and then defining (k-1) more cluster centers such that $$|\bar{a}_{ci}-\bar{a}_{cj}|>Th4 \qquad (8)$$

is satisfied when i,j∈(1,k), i≠j, i≠k and j≠k. The threshold Th4 determines the distance between the cluster centers, and may be adjusted to calibrate the system.

Next, in step S430, the control system assigns every affine parameter set $\bar{a}_i$ to a cluster. The control system assigns the affine parameter set $\bar{a}_i$ by determining which cluster center $\bar{a}_{ck}$ is closest to the affine parameter set $\bar{a}_i$. The control system then assigns that affine parameter set to that cluster. Then, in step S440, the control system calculates new cluster centers $\bar{a}_{cknew}$ such that:

$$\bar{a}_{cknew} = \frac{1}{W} \sum_{j=1}^{W} \bar{a}_j \qquad (9)$$

where:

$\bar{a}_j$ is an affine parameter set that is assigned to new cluster k, and

W is the number of elements in the new cluster k.

Next, in step S450, the control system determines if any two cluster centers are too close to each other. If, for any two cluster centers $\bar{a}_{ci}$ and $\bar{a}_{cj}$, $$|\bar{a}_{ci}-\bar{a}_{cj}|<Th6 \qquad (10)$$

is satisfied, the two cluster centers are too close to each other. If the centers are too close control moves to step S460. Otherwise, control skips to step S470. The threshold Th6 defines the minimum distance between cluster centers, and may be adjusted to calibrate the system.

In step S460, the control system merges the clusters i and j that are too close to each other and calculates a new cluster center $\bar{a}_{cnew}$ as:

$$\bar{a}_{cnew} = \frac{1}{W_1+W_2} \sum_{j=1}^{W_1+W_2} \bar{a}_j \qquad (11)$$

where:

$W_1$ and $W_2$ are the number of elements in clasess i and j, respectively, and $\bar{a}_j$ is a member of either cluster i or j. Control then continues to step S470.

In step S470, the control system determines which cluster has the most elements. The control system then chooses the center of this cluster $\bar{a}_{cm}$ as the affine parameter set to calculate the global motion estimates. Control then returns to step S256.

Figure 16:
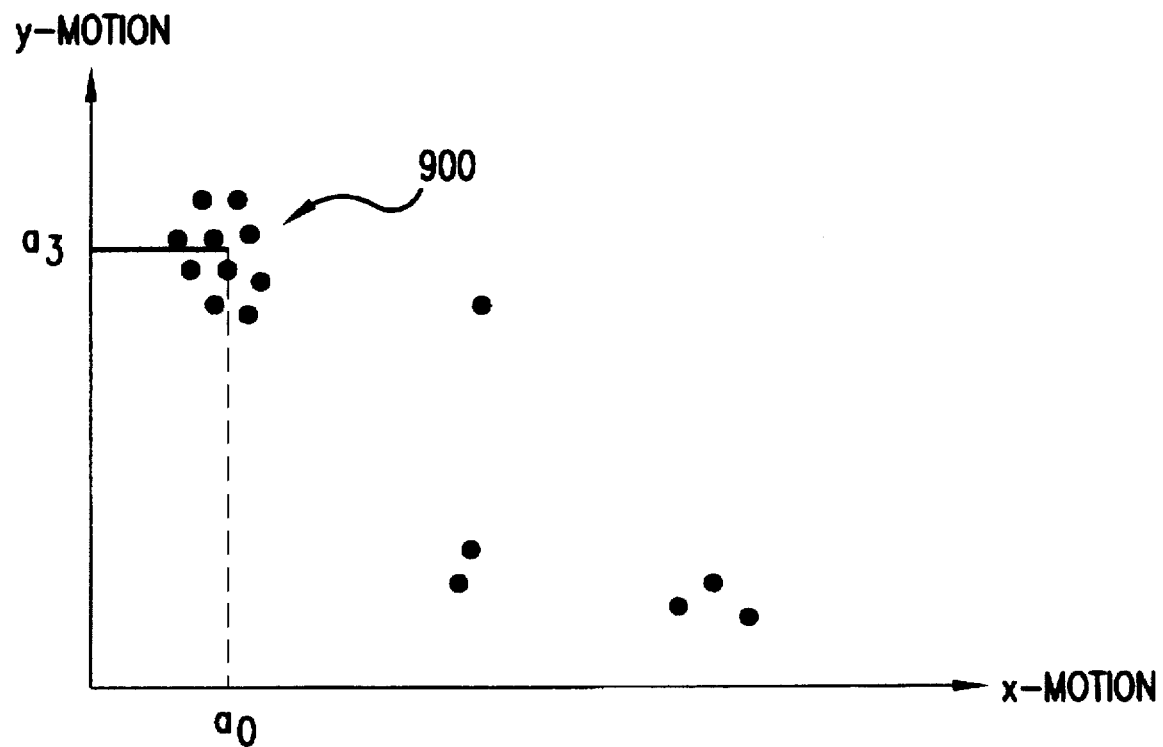
FIG. 16 illustrates the estimated affine parameters in two-dimensional space for 8×8 blocks of images pixels in the presence of both global and local motion.

An illustrative example is shown in FIG. 16, which is a graph of the estimated affine parameters, in two-dimensional space, for hypothetical 8×8 blocks of the image pixels in the presence of both global and local motion. Because the control system chooses the affine parameter set at the center of the cluster 900 with the most members, the effects of local motion on the affine parameter estimates are minimized, resulting in a more accurate global motion estimate.

Figure 18:
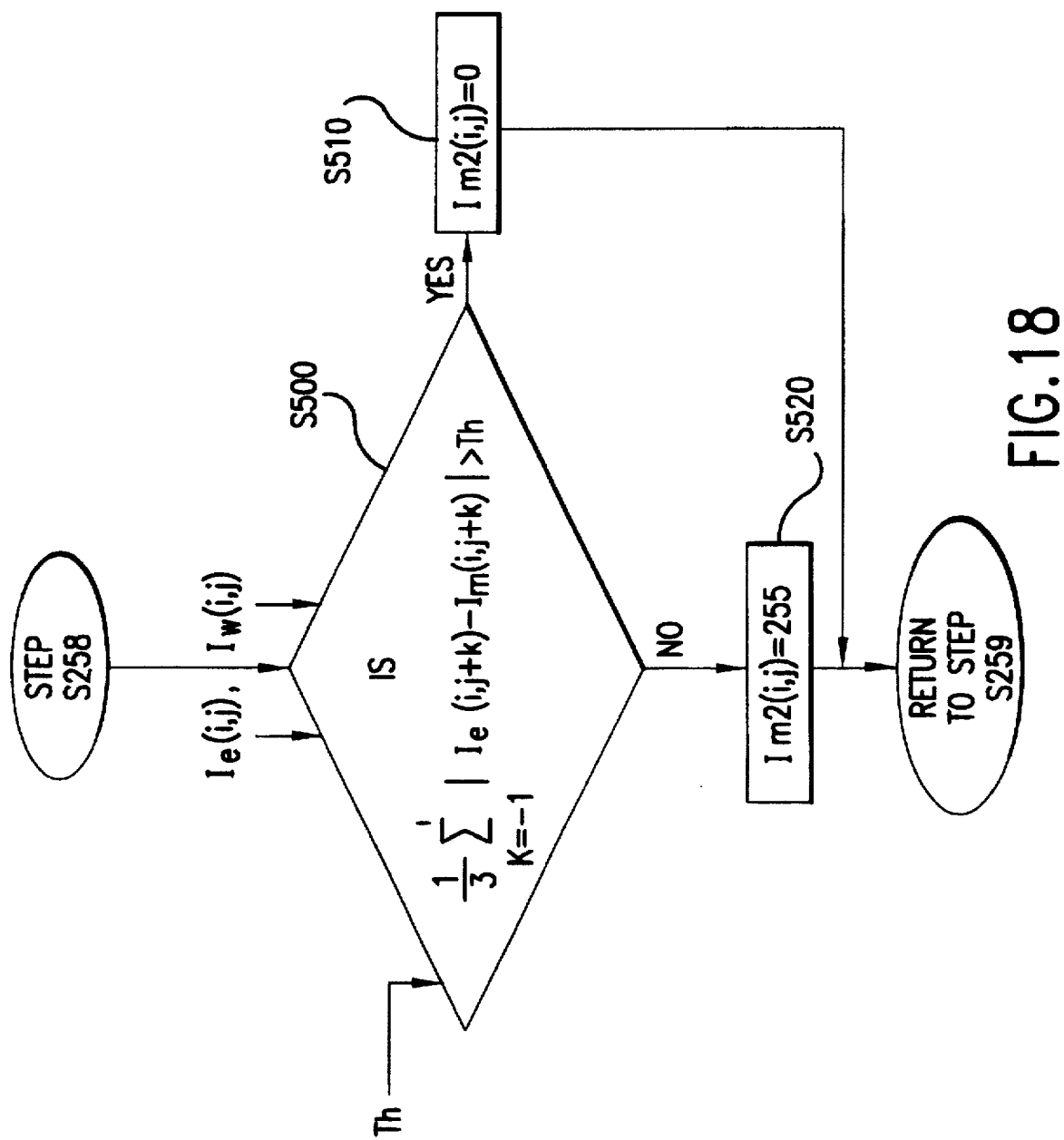
FIG. 18 is a flow chart of a preferred control routine for the motion map calculation step of FIG. 10.

The control routine of FIG. 18 operates in the same way as the control routine of FIG. 10, with the steps S500, S510 and S520 in FIG. 18 corresponding to steps S222, S224 and S226, respectively, in FIG. 10. The only differences are the inputs in step S500, which are the gray levels of the E field $I_e(i,j)$ and the gray levels of the motion-compensated O field $I_w(i,j)$. In the resulting motion map M2, the image pixels that have undergone local motion have a gray-level value of "0".

Figure 19:
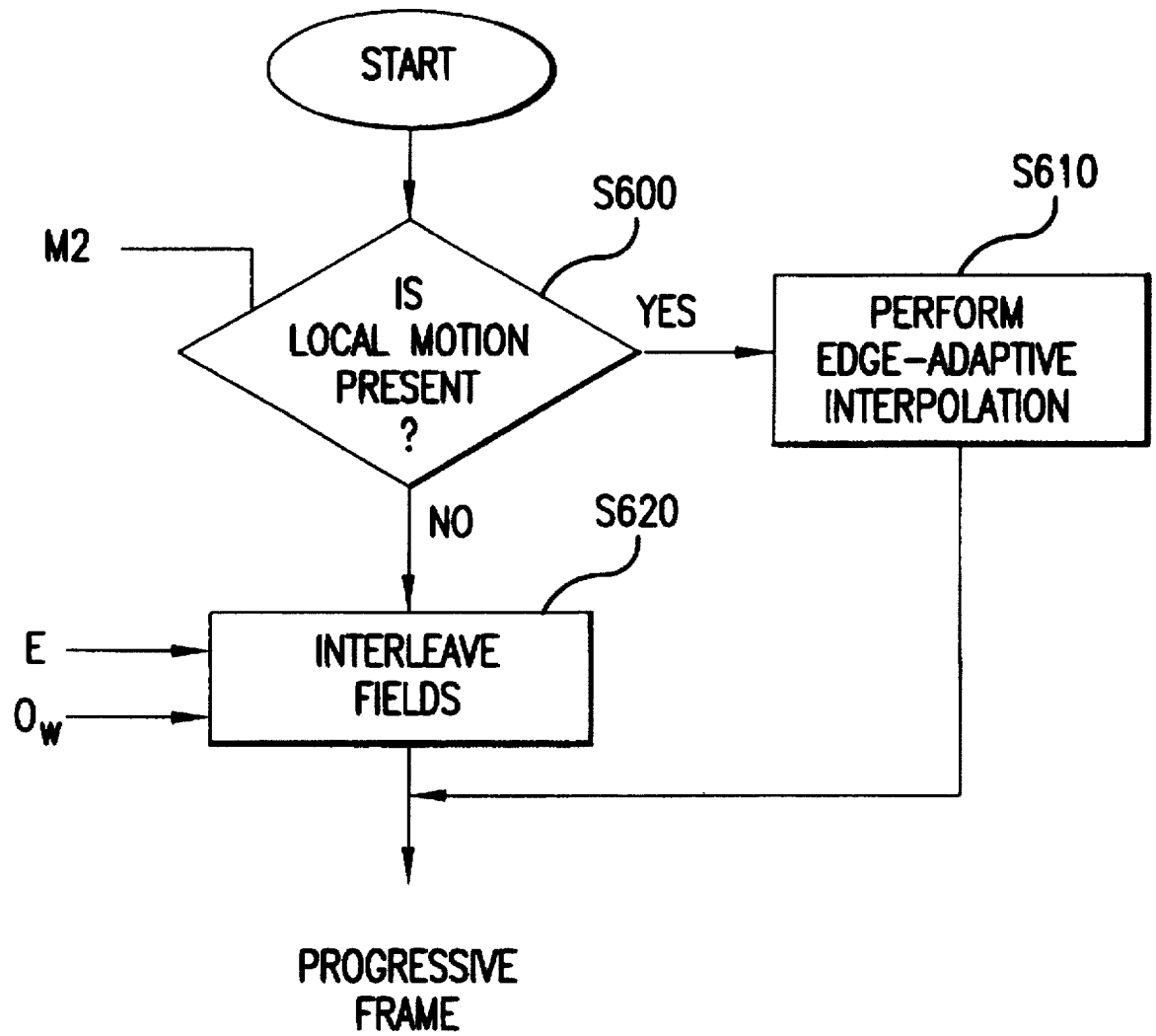
FIG. 19 is a flow chart of a preferred control routine for the motion-adaptive filtering step of FIG. 10.
Figure 20:
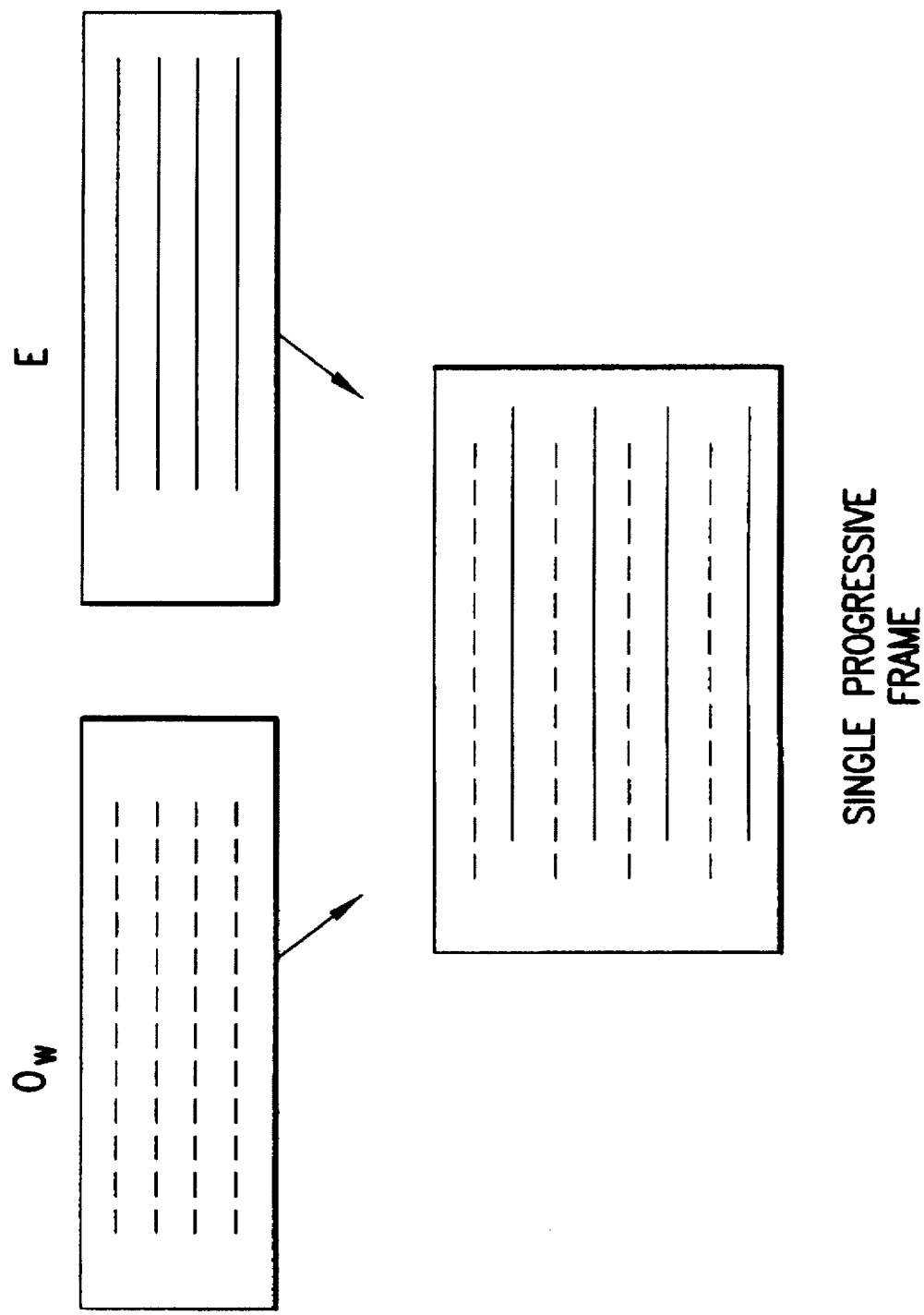
FIG. 20 illustrates the merging of an even field and an odd field into a single frame.

As shown in FIG. 19, at step S600, the control system determines if any pixel has undergone local motion by analyzing the gray-level values in the motion map M2. If any local motion is present, control continues to step S610. Otherwise, if no local motion is present, control jumps to step S620. In step S610, the control system locally interpolates the pixels affected by the local motion using the well-known edge-adaptive interpolation techniques described in Wang et al. In step S620, the control system interleaves the E and $O_w$ fields into a single progressive frame, as shown in FIG. 20. Control then continues to step S259, which returns control to step S290.

The motion-compensating de-interlacer 200 and the image processor 300 are preferably implemented on programmed general purpose computers. However, they can also be implemented on a special purpose computer, a programmed microprocessor or microcontroller and peripheral integrated circuit elements, an ASIC or other integrated circuit, a hardwired electronic or logic circuit such as a discrete element circuit, a programmable logic device such as a PLD, PLA or PAL, or the like. In general, any device on which a finite state machine, capable of implementing the flowcharts shown in FIGS. 8, 10, 12, 13, 14, 18 and 19, can be implemented can be used to implement the motion-compensating de-interlacer 200 or 300 of this invention.

Figure 2:
FIG. 2 is a progressive video frame recorded while both local motion within the scene and camera motion occurred.
Figure 3:
FIG. 3 is a progressive video frame corresponding to FIG. 2 generated using line repetition techniques.
Figure 4:
FIG. 4 is a progressive video frame corresponding to FIG. 2 generated using motion- adaptive interpolation.
Figure 21:
FIG. 21 is a motion-compensated progressive video frame having both global and local motion corresponding to FIG. 2, where the methods of this invention are used to compensate only for the global motion.

FIG. 21 shows a motion-compensated progressive video frame having both global and local motion corresponding to FIG. 2, where only the global motion is compensated for using this invention.

Figure 22:
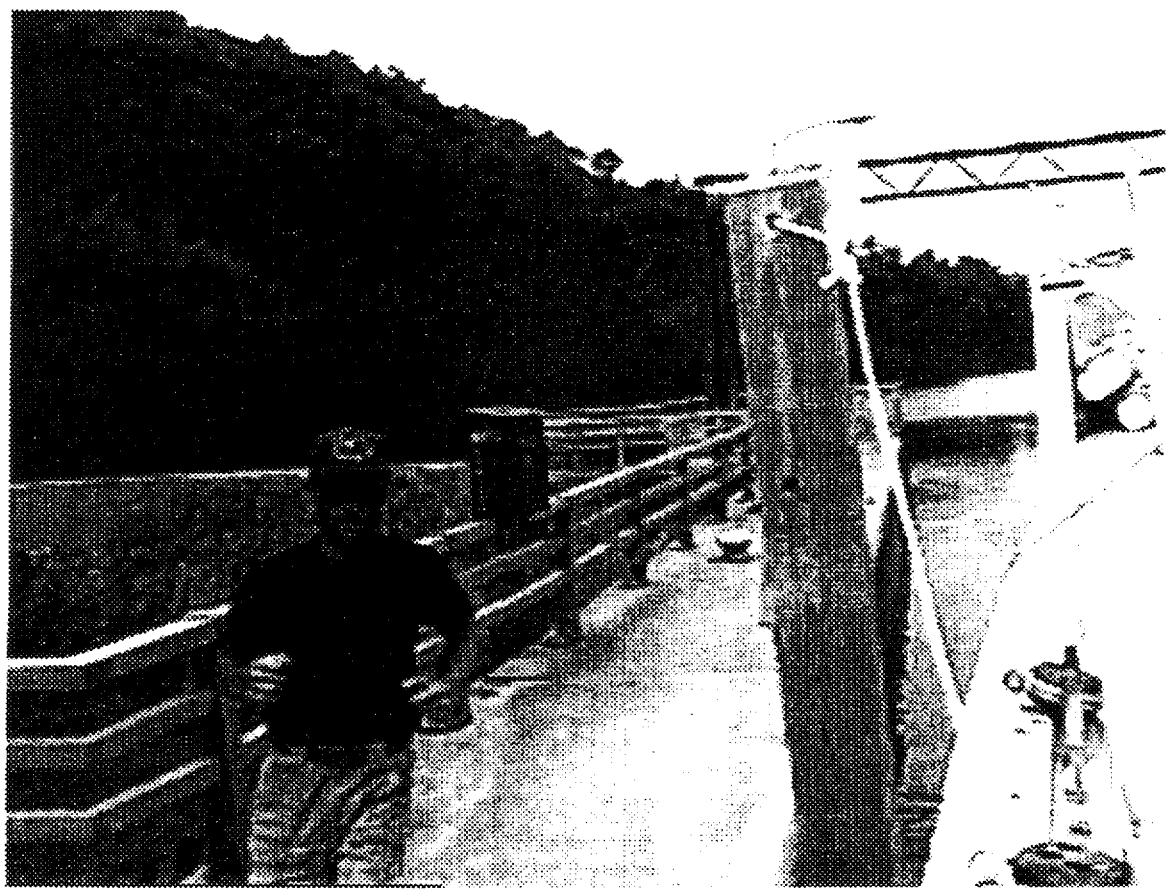
FIG. 22 is a motion-compensated video frame having both global and local motion corresponding to FIG. 2, where the methods of this invention are used to compensate for both the global motion and the local motion.

FIG. 22 shows a motion-compensated progressive video frame having both global and local motion corresponding to FIG. 2, where both the global motion and the local motion are compensated for using this invention.

Figure 1:
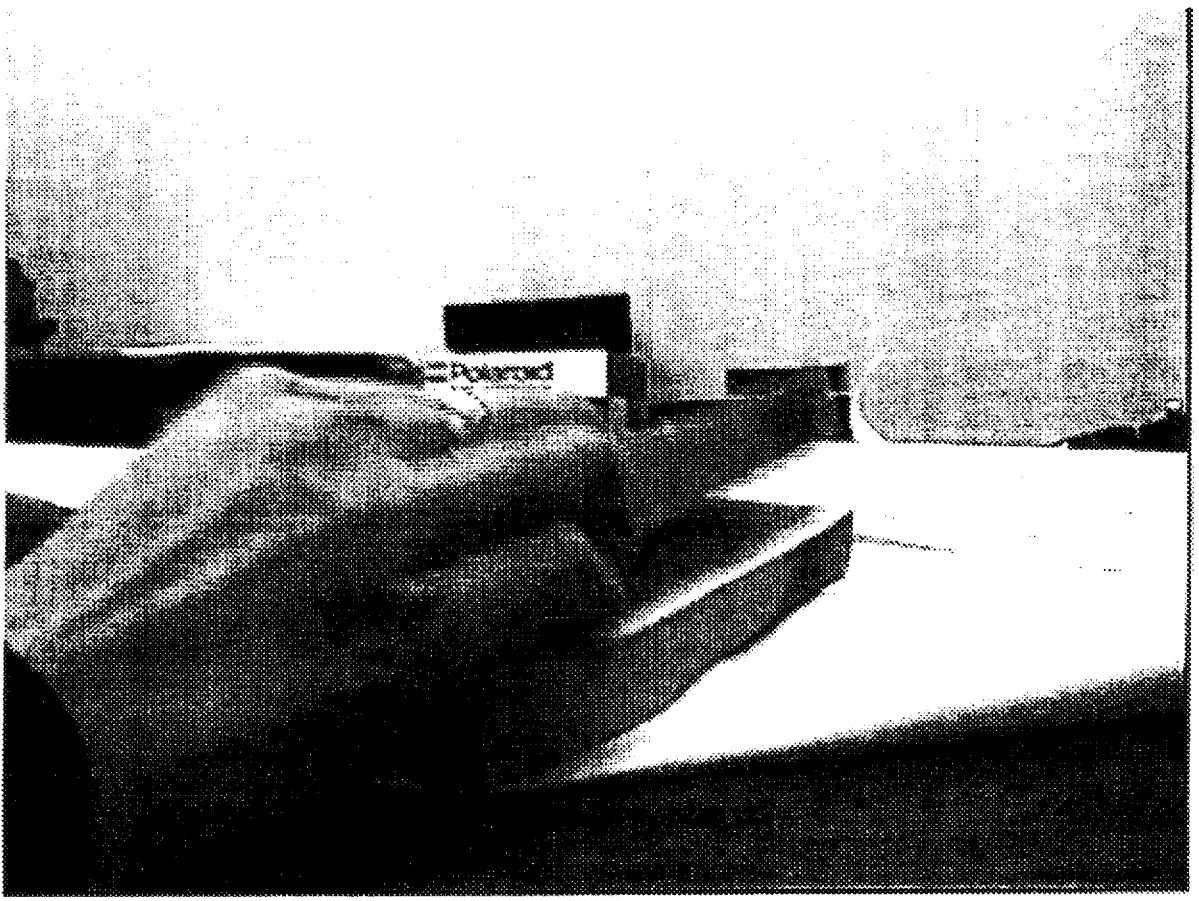
FIG. 1 is a progressive video frame recorded while local movement occurred in the scene.
Figure 23:
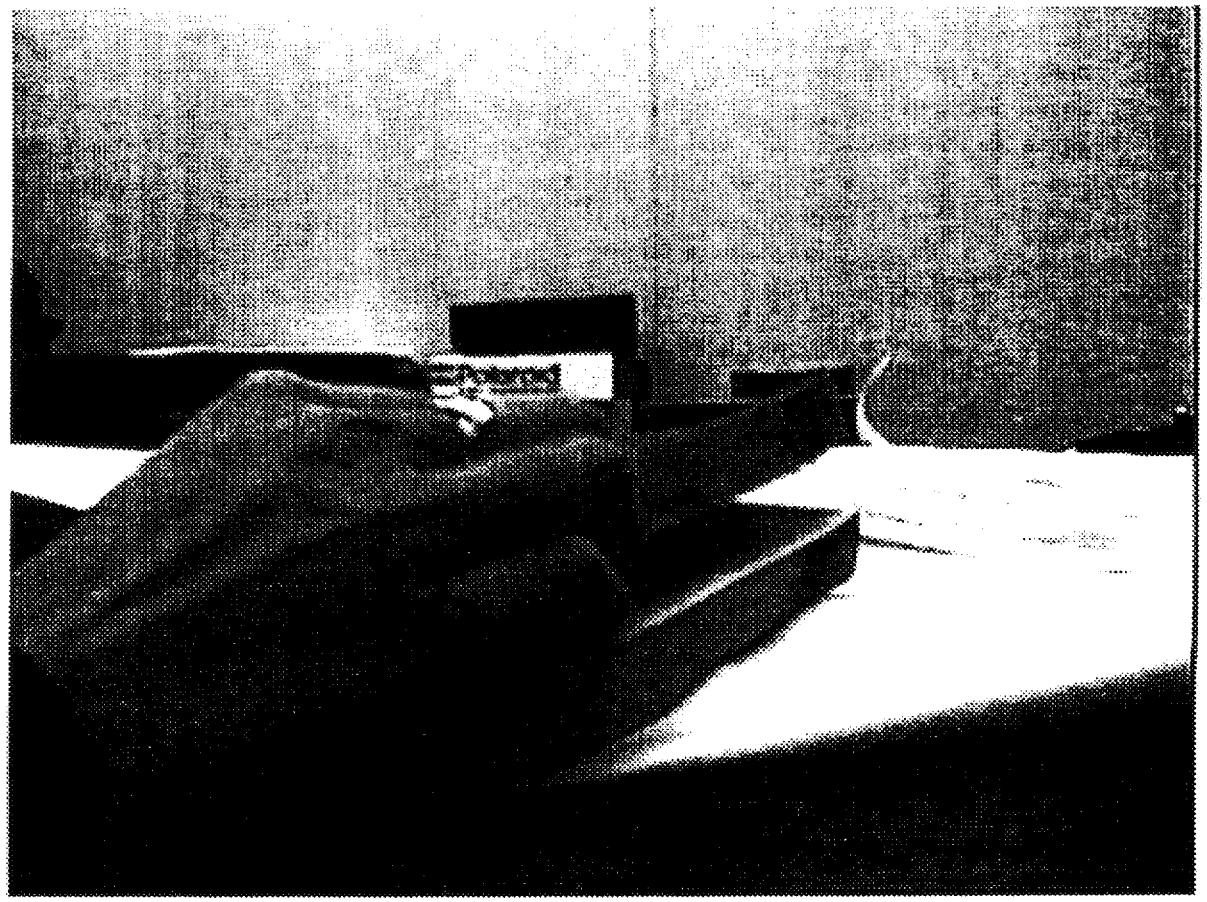
FIG. 23 is a motion-compensated progressive video frame having only local motion corresponding to FIG. 1, where the methods of this invention are used to compensate for the local motion.

FIG. 23 shows a motion-compensated progressive video frame having only local motion corresponding to FIG. 1, where the local motion is compensated for using this invention.

The compensated video frames of FIGS. 21–23 have higher resolution and exhibit a smaller "staircase" effect when compared to the corresponding video frames of FIGS. 1 and 2.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative not limiting. Various changes may be made without departing from the spirit and scope of the invention as defined in the following claims.

What is claimed is:

1. A system for generating motion-compensated progressive video frame from an interlaced initial video frame, comprising:

a field splitter that splits the initial video frame into an even field and an odd field;

a global motion determiner that determines if global motion is present in the initial video frame;

a global motion compensator, responsive to the global motion determiner, that generates a globally-compensated video frame from the initial video frame when global motion is present in the initial video frame;

a local motion determiner that determines if local motion is present in the initial video frame when no global motion is present in the initial video frame, and that determines if local motion is present in the globally-compensated video frame when global motion is present in the initial video frame;

a local motion interpolator, responsive to the local motion determiner, that generates a locally-interpolated video frame from the initial video frame when only local motion is present in the initial video frame, and from the globally-compensated video frame when local motion is present in the globally-compensated video frame; and a field combiner, responsive to the global and local motion determiners, that combines the even and odd fields of the initial video frame into a single progressive video frame when substantially no local motion and substantially no global motion is present in the initial video frame, and that combines the even and odd fields of the compensated and/or interpolated video frame into a single progressive video frame when global motion, local motion or both global and local motion are present in the initial video frame.

2. The system of claim 1, wherein the global motion determiner comprises:

a motion map calculator that calculates a motion map between the even and odd fields, said motion map containing motion map pixels with respective gray-levels that correspond to global motion present in the initial video frame; and a pixel counter that counts the number of motion map pixels having a predetermined gray-level value.

3. The system of claim 1, wherein said global motion compensator comprises a motion-compensating filter.

4. The system of claim 1, wherein said local motion interpolator comprises a motion-adaptive filter.

5. The system of claim 4, wherein said motion-adaptive filter comprises an edge-adaptive interpolator.

6. A system for generating motion-compensated progressive video frame from an interlaced initial video frame, comprising:

a field splitter that splits the initial video frame into an even field and an odd field;

a motion map calculator that calculates a motion map between the even and odd fields, said motion map containing motion map pixels with respective gray-levels that correspond to global motion present in the initial video frame;

a pixel counter that counts the number of motion map pixels having a predetermined gray-level value;

a motion-compensating filter that globally compensates the initial video frame when global motion is present in the initial video frame, that locally compensates the globally-compensated video frame if local motion is present, and combines the even and odd fields of the globally and/or locally compensated video frame into a single progressive video frame;

a motion-adaptive filter that locally interpolates the initial video frame if local motion is present, and combines the even and odd fields of the locally-interpolated video frame into a single progressive video frame;

a field interleaver that interleaves the even and odd fields of the initial video frame when substantially no local motion and substantially no global motion is present in the initial video frame; and a controller that communicates with and controls the operation of the field splitter, motion map calculator, motion-compensating filter, motion adaptive filter and field interleaver, wherein said controller determines if global or local motion is present in the initial and compensated video frames, sends the even and odd fields of the initial video frame to the motion-compensating filter if global motion is present, sends the even and odd fields of the initial video frame to the motion-adaptive filter if substantially no global motion is present, and sends the even and odd fields of the initial video frame to the field interleaver if substantially no global motion and substantially no local motion is present in the initial video frame.

7. The system of claim 6, wherein the motion-compensating filter compensates for global motion by calculating a set of affine parameters that estimate the global motion, and warping one of the initial video frame fields with the set of affine parameters.

8. The system of claim 7, wherein the motion-compensating filter calculates the set of affine parameters that estimates the global motion by performing a least-squares estimation technique on all image pixels in one of the fields of the initial video frame.

9. The system of claim 7, wherein the motion-compensating filter divides one of the fields into 8×8 blocks of image pixels, and determines a set of affine parameters for each block by performing a least-squares estimation technique on each block.

10. The system of claim 9, wherein the motion-compensating filter divides the affine parameter sets into clusters, and chooses an affine parameter set at a center of a cluster with the most affine parameter sets as the set that estimates the global motion.

11. A method of motion-compensating and de-interlacing video frames, comprising the steps of:

determining if global motion is present in an initial video frame;

globally compensating the initial video frame if global motion is present;

determining if local motion is present in the globally-compensated video frame;

locally interpolating the globally-compensated video frame when local motion is present;

determining if local motion is present in the initial video frame when no global motion is present in the initial video frame;

locally interpolating the initial video frame when local motion is present;

combining an even and odd field of the initial video frame into a single progressive video frame when no local motion and no global motion is present in the initial video frame; and combining an even and odd field of the locally interpolated and/or globally compensated video frame into a single progressive video frame when local and/or global motion is present in the initial video frame.

12. The method of claim 11, wherein the global motion determination is made by:

splitting the initial video frame into an even field and an odd field;

calculating a motion map between the even and odd fields, said motion map containing motion map pixels with respective gray-levels that correspond to global motion present in the video frame;

counting the number of motion map pixels having a predetermined gray-level value; and determining that global motion is present in the initial video frame when the number of image pixels with a predetermined gray-level value exceeds a predetermined threshold.

13. The method of claim 12, wherein the initial video frame is globally compensated using motion-compensating techniques.

14. The method of claim 13, wherein the initial video frame is globally compensated by:

calculating affine parameters that estimate the global motion using affine parametrization techniques; and warping one of the fields using the affine parameters.

15. The method of claim 14, wherein the affine parameters are calculated by performing a least-squares estimation technique on all image pixels in one of the fields.

16. The method of claim 14, wherein the affine parameters are calculated by:

dividing one of the fields into 8×8 blocks of image pixels;

calculating a set of affine parameters for each block by performing a least-squares estimation technique on each block;

dividing the affine parameter sets into clusters;

determining which cluster has the most affine parameter sets; and choosing an affine parameter set at a center of the cluster with the most affine parameter sets.

17. The method of claim 11, wherein the globally-compensated video frame is locally interpolated using motion-adaptive techniques.

18. The method of claim 17, wherein the globally-compensated image is locally interpolated using edge-adaptive interpolation.

19. The method of claim 11, wherein the initial video frame is locally interpolated using motion-adaptive techniques.

20. The method of claim 19, wherein the initial video frame is locally interpolated using edge-adaptive interpolation.

* * * * *